United States Patent [19]
Wilcox

[11] 3,787,022
[45] Jan. 22, 1974

[54] IRIS CHECK VALVE AND USE THEREOF

[76] Inventor: Charles F. Wilcox, 201 W. Cudahy, Bartlesville, Okla. 74003

[22] Filed: May 22, 1972

[21] Appl. No.: 255,648

[52] U.S. Cl. .................................. 251/212
[51] Int. Cl. ............................... F16k 3/03
[58] Field of Search .................... 251/212

[56] References Cited
UNITED STATES PATENTS

| 998,400 | 7/1911 | Ruth | 251/212 X |
| 2,307,273 | 1/1943 | Hughes | 251/212 |
| 2,614,789 | 10/1952 | Labour | 251/212 |
| 3,101,736 | 8/1963 | Egger | 251/212 X |

Primary Examiner—Arnold Rosenthal

[57] ABSTRACT

An iris type check valve is provided having at least one matched pair of vanes which are actuated by a rotating plate to modify the size of the orifice and thus regulate flow of materials through the unit. The vanes are constructed to provide an interlocking of the respective vane members of the matched pair. Thus the valve unit is capable of withstanding extremely high fluid pressures. The use of the valve in discovery and production of underground fluids is also described.

9 Claims, 5 Drawing Figures

IRIS CHECK VALVE AND USE THEREOF

BACKGROUND OF THE INVENTION

1. Field of the Invention

This invention relates to a check valve generally characterized as being of the iris type. In a further aspect, the invention relates to a method of regulating the flow of fluids, particularly fluids under high pressure using the valve of my invention. In still a further aspect, this invention relates to a method of producing naturally occurring underground fluids such as oil, gas, or water using my high pressure iris type valve. In a still further aspect, this invention relates to a method of drilling and producing oil and gas at an offshore location using my new iris check valve.

2. Description of the Prior Art

A problem of discovering, producing and transporting naturally occurring fluids is characterized by the requirement that some method be provided to intercept the fluid flow as soon as possible. This requirement is of particular importance in protecting the environment from events such as producing well blowouts, pipeline failures and explosions.

Heretofore, the rapid and immediate shut off of fluid flow has been virtually impossible to achieve. This is primarily due to the fact that conventional types of valves cannot be actuated to effect variation or ceasation of fluid flow from a remote location, cannot act at a sufficient rate of speed to interrupt flow prior to an explosion or pollution of the environment, or are not capable of withstanding high pressures without structural failure.

Furthermore, in many instances it has not been practical to place a shut off valve in a location where one is desired to protect the environment. For example, in offshore drilling operations the drilling string must be suspended from a platform over the production hole to accomplish drilling. Due to the remote location of the hole on the ocean floor with reference to the drilling platform, there is no known method to completely shut off the flow of oil and gas in case the well blows out.

OBJECT OF THE INVENTION

It is an object of this invention to provide a check valve which is capable of rapid closure to interrupt or regulate the flow of fluids therethrough. It is a further object of this invention to provide a valve capable of interrupting and regulating fluid flow through a line at a point which is remote from an operator. It is a further object of this invention to provide a valve which can be employed in the discovery and production of underground fuel and gas reserves. Other objects and advantages of the present invention will be readily apparent from a careful reading of the summary of the invention, detailed description of the invention and the claims.

SUMMARY OF THE INVENTION

The valve of my invention comprises a suitable sealed casing into which is rotatably mounted a concentric actuating drive plate. The actuating plate is driven by a suitable drive means, and rotational movement of this plate causes the valve to open and close. The closure members of my valve are at least two iris vanes which comprise a matched set. One vane member is designed to coincidentally fit with the other vane member in an interlocking arrangement which, when completely shut, form a plate which restricts fluid flow. The vane members are configured in such a manner that when moved laterally from a closed position they form an orifice through which fluid passes. Each vane is pivotly mounted within the casing and the movement of each in a lateral direction (to fluid flow) is retarded or aided by a spring tension device.

BRIEF DESCRIPTION OF THE DRAWING

The drawing presents five figures.

DETAILED DESCRIPTION OF THE INVENTION

Figure 1:
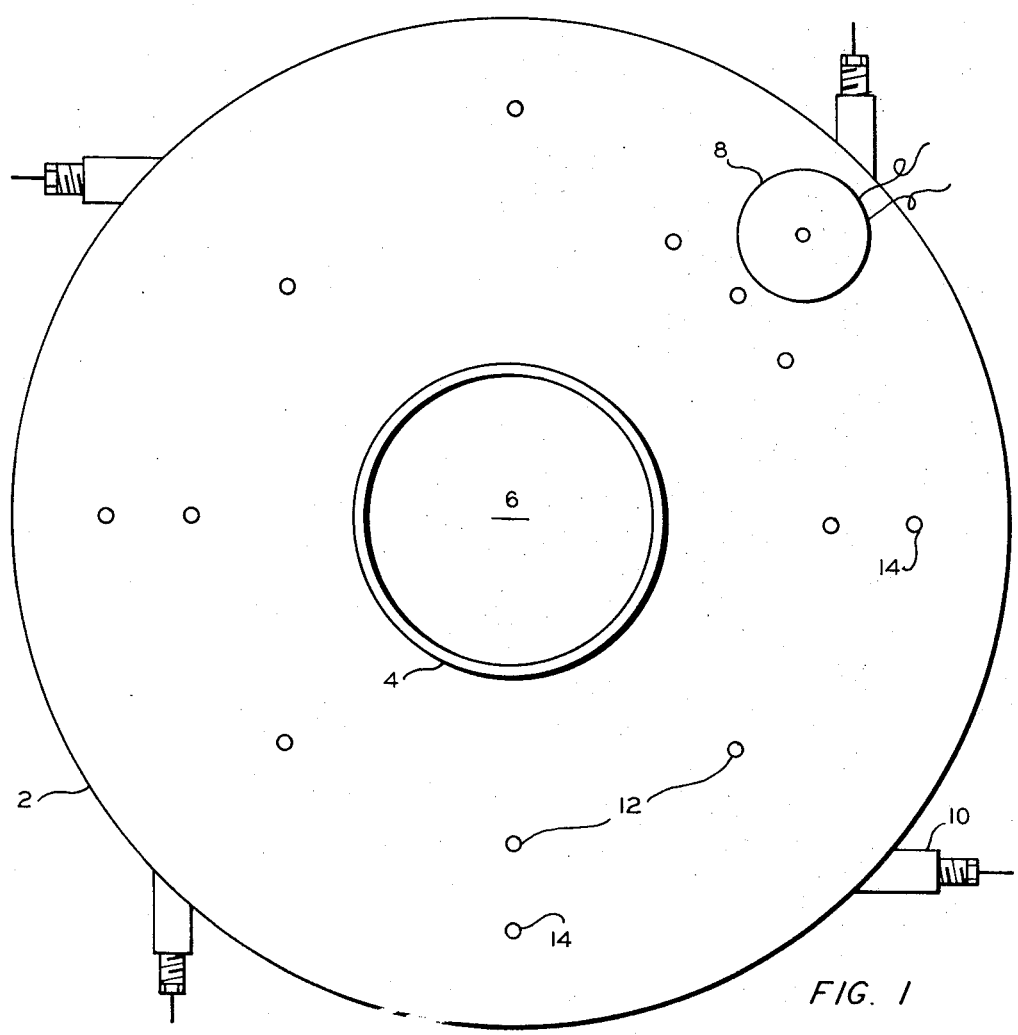
FIG. 1 is a top view of a preferred embodiment of my valve.

My invention can best be understood by reference to the drawing. FIG. 1 presents a top view of a preferred embodiment of the valve of the invention. The generally circular casing has thereon an outlet pipe 4 which defines the inlet orifice 6 of the valve. The outlet pipe is preferably of the same diameter as the valve orifice although it may be slightly smaller or larger as desired. In addition pipe 6 can be threaded to receive the end of a suitable section of pipe, although other means of attachment such as welding can be used if desired. Also mounted on casing 2 is an activating means 8 which can comprise an electrical motor, a wheel driven or ratchet drive means, or any other suitable mechanical or electrical device which is capable of exerting rotational force. Extending outwardly from the sides of casing 2 are four tension mounting brackets 10 which support a tension means discussed hereinafter.

On the surface of casing 2 there are provided a plurality of studs which extend into the interior of the valve. Studs 12 are bolted or welded into casing 2 to provide mountings for bearings which aid in the rotational movement of the actuating plate. Studs 14 are the iris vane pivot pin mounts which are discussed in more detail hereinafter. It should be noted that these studs are preferably positioned along a ninety degree axis from the center of orifice 6.

Figure 2:
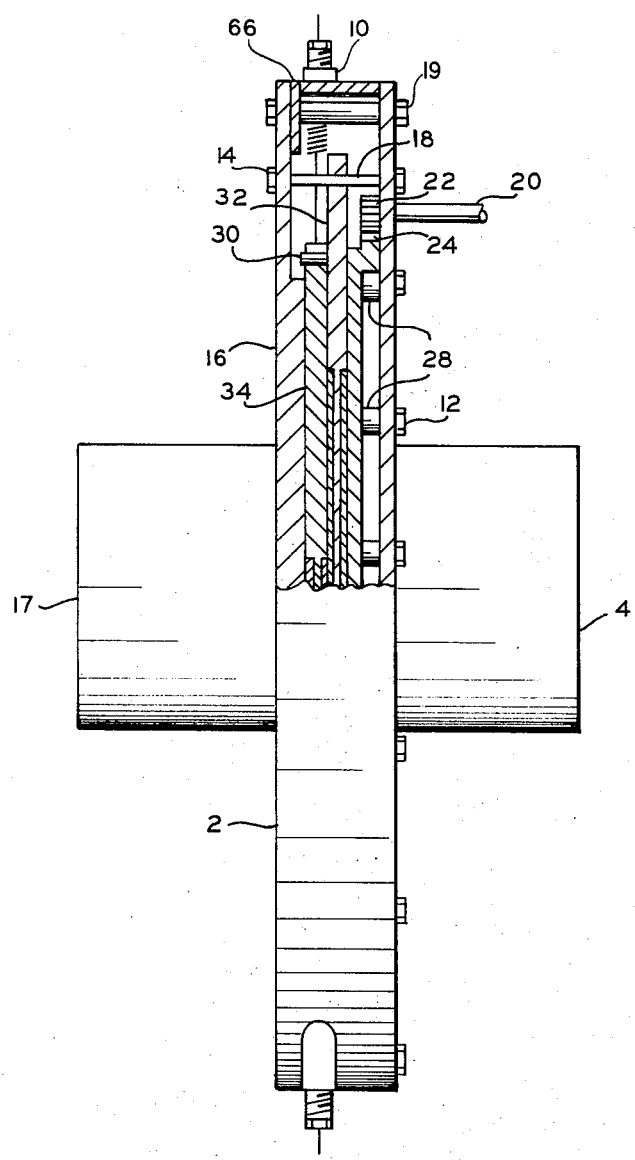
FIG. 2 presents side view of the valve of FIG. 1 partially in cross-section.

In FIG. 2, the preferred valve of my invention is shown in a side view partially in cross-section. Casing 2 also comprises a bottom plate 16 attached by suitable bolts 19 (not shown in FIG. 1) which ring the periphery of the casing 2. Sealing ring 66 is a concentric ring welded to the bottom edge of casing 2 which provides a bottom plate seal for the valve. Of course, a suitable gasket or other sealing means can be interdisposed between the inner surface of plate 16 and ring 66 to ensure an airtight seal to the interior of the valve. Bottom plate 16 has mounted thereon inlet pipe 17. In all other respects pipe 17 is the same as outlet pipe 4 with respect to the relative diameter thereof, the pipe attachment means, and the like.

Prior to explaining the relative positions of the iris valve vane members within casing 2 and the movement thereof to open and close the valve, it is best at this point to explain the configuration of the vane members.

The vane members are matched sets of which there is at least one, and preferably two sets. Each set when closed comprises a vane plate which presents a restriction which is disposed at a right angle to the flow of fluid through the unit. Each set is comprised of a female vane member, illustrated in FIG. 3a and a male vane member, illustrated in FIG. 3b.

The female vane member 36 and the male member 38 are unique in that the general shape thereof is identical. For the purpose of this specification and claims, this shape is defined as being generally triangular, with one edge of the triangle being partially removed to form a half-circle therein. The apex of this triangle is the point wherein the vane member contains the orifice 40 about which pivotal movement is effected. Each of vane members 36 and 38 contain a pivot pin orifice 40, adjacent to which is a vane actuating slot 42. On the edge of the generally triangular shaped vane adjacent to that portion of the edge which is removed to form the half-circle, there is provided a tension attachment means 21 preferably in the form of a welded eyelet.

Figure 3A:
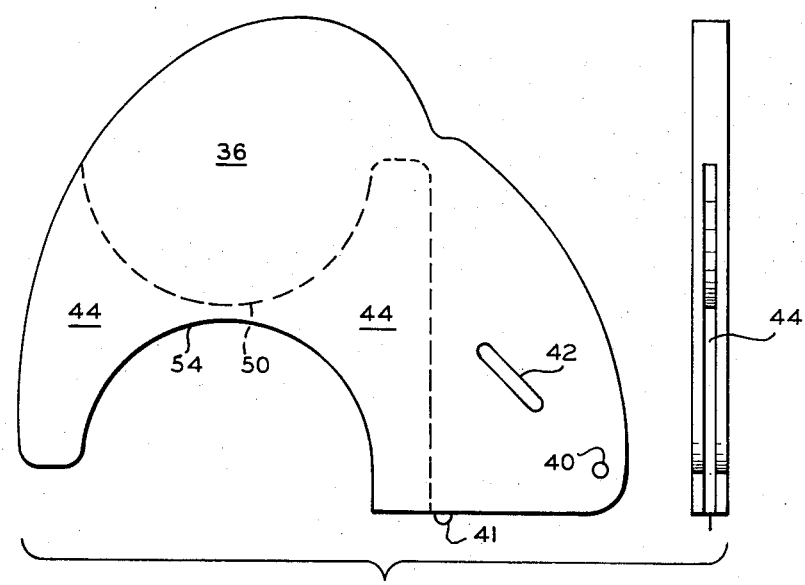
FIGS. 3a and 3b depict the preferred configuration of a matched set of vanes, both in plane top view and full cross-section.
Figure 3B:
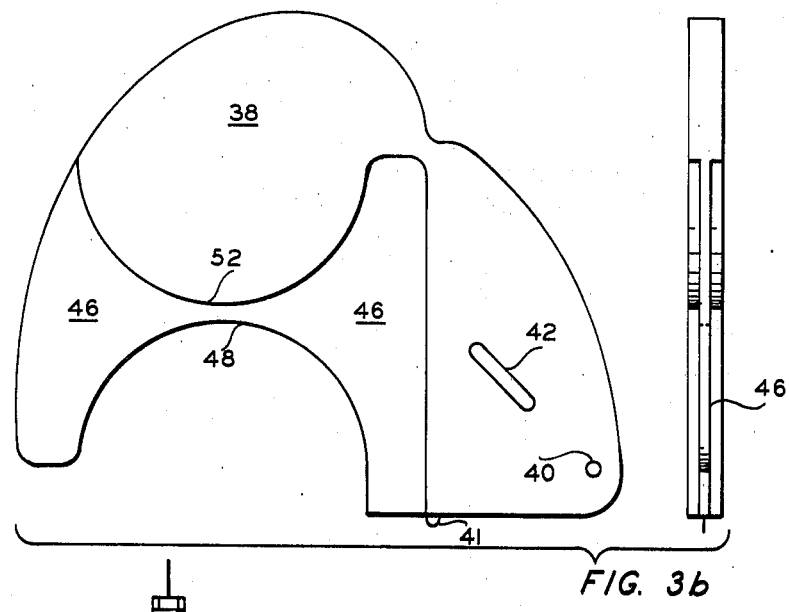

Female vane member 36 is configured to provide a recessed portion 44 as shown in the cross-section of FIG. 3a, and outlined by the dotted lines on the plane view of FIG. 3a. The recessed portion 44 defines an area which receives the projecting portion of vane 38. Male vane member 38 is provided with a projecting portion 46 which slips into the recessed portion 44 of vane 36. Together the two vane members cooperate to form a unitory composite plate wherein edge 52 of vane 38 cooperates with edge 54 of vane 36 and edge 50 of vane 36 cooperates with edge 48 of vane 38.

The half circle as defined by the lower edge of the generally triangular shaped vanes is of a radius equal to one-half the diameter of the orifice 6 when the valve is in its fully opened position. Thus, when each of the vane members are actuated as hereinafter described to move from a fully closed position to a fully opened position, the opening in the valve is defined by the edge of the above defined half circle of each member (edges 48 and 54). The male projection portion slides out of the female vane member and the opening is defined by each of the half-circle cutouts of the vanes as surfaces 54 and 48 are retracted one from the other.

Figure 4:
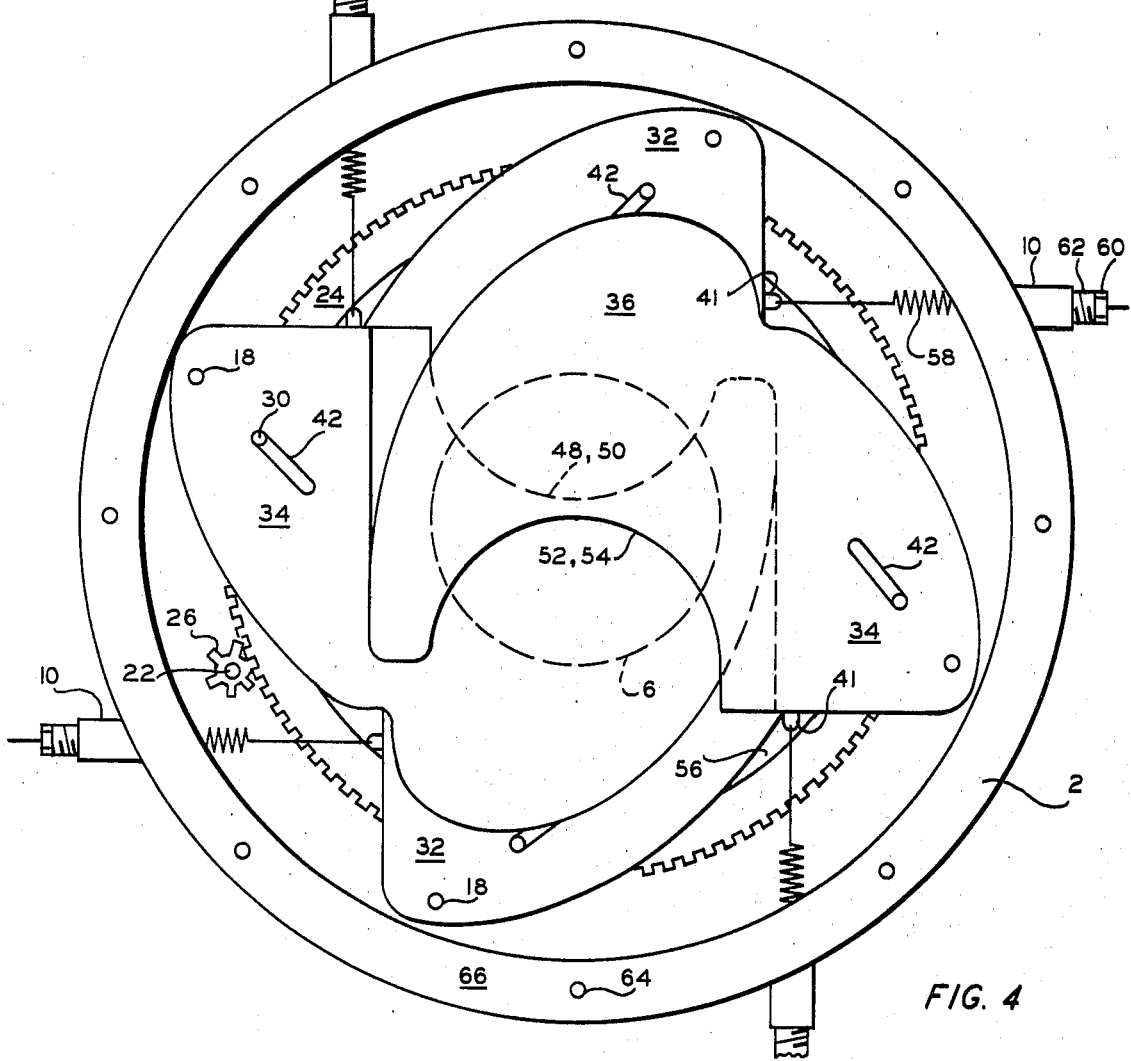
FIG. 4 of the drawing presents a bottom view of the valve of FIGS. 1 and 2 wherein the bottom plate of the casing has been removed and the valve is in a fully closed position.

In FIGS. 2 and 4 of the drawing, the vane members are shown positioned within casing 2 in a closed configuration. The upper matched set of vanes forms vane plate 32 which is disposed along the lower vane plate 34. The position of the respective plates defined by the axis between pivot pins 18 is a 90° angle. Plate 24 is also provided with a concentric raised surface 56 on which the upper plate 32 slidably contacts as the vane members move laterally. A circular actuating plate 24 is positioned below the upper surface of casing 2 and is provided with gear teeth on its lateral edge. The gear teeth of plate 24 mesh with the teeth 26 on activating means 20. The rotational movement of plate 26 is aided by bearings 28 which are located on the interior circumferential length of plate 26. The bearings are mounted on studs 12 as shown in FIG. 1.

Equidistantly spaced on the lower surface of plate 24 are the actuating pins 30. Each of the matched pairs of vanes are pivotaly mounted on pivot pins 18. It is to be noted that positions of the pivot pins 18 and actuating pins 30 are on different 90° axes with the pivot pin axis rotated toward the direction of rotation of plate 26. As illustrated in FIG. 4, the direction of rotation is counter-clockwise.

Each of the vane members is maintained in tension allignment with a tension spring 58 which is attached to the vane member at eyelet 41 located thereon. The position of the tension mounting bracket 10 in relation to the pivot point of each vane member is also essentially a right angle. The tension spring 58 is retained in threaded bracket 10 by spring adjustment means 60 which contains threads 62 which engage the threads of bracket 10.

In operation, power is applied to activating means 8 which causes the clockwise rotation of drive means 20 and gear 26. Engagement of gear 26 with plate 24 causes the counter-clockwise rotation of plate 24. The rotation of plate 24 causes the actuating pins 30 to force the vane members of each set of vanes outwardly one from the other by the movement of pin 30 within vane slot 42. As each member of a pair of vanes moves outwardly, and for example, with reference to the lower vane plate 34 in FIG. 4, surfaces 52, 54, and 48, 50 disengage, an opening is formed between the edges of the plates as defined by the half-circle portion thereof and tension on the spring means 58 is increased. Once the power source is removed from drive means 20, the tension means 58 causes the vane members to reingage almost instantly, thus closing opening 6.

The pressure retention properties of my valve are immediately apparent from the foregoing description. The vane plates when closed present two sheets of steel disposed at right angles to fluid flow. Because of raised surface 56 on actuating plate 24 and the raised surface on bottom plate 16, the vane plates are held in proper closed allignment, and must be moved over these surfaces to assume an open position. High pressure fluid entering inlet 17 exerts pressure against vane plate 34. This force is thus transferred from plate 34 to plate 32 and to surface 56 of the plate 24. Thus the amount of friction between the plates is increased, requiring additional force to open the valve. The male-female relationship of the vanes inhibit high pressure seepage through the valve because of the tortuous path the fluid must follow to gain release from confinement. Of course suitable seals can be provided on the edges of the vane members and on other moving surfaces to inhibit any fluid flow around the plates.

Of course, various modifications of the preferred valve described above are immediately apparent. While at least two separate pairs of matched vanes are desirable for high pressure applications, only one pair may be needed where lower pressures are contemplated. In addition, where extremely high pressures are involved, more than two pairs of vanes can be used, although it may be necessary to provide an additional actuating plate and set of vanes below those described above. To insure silt free operation when passing solid entrained fluids through the unit, a flexible elastomeric collar can be positioned within inlet pipe 17 to extend into opening 6 when the valve is opened. When the valve closes, this rubbery collar is merely pushed out of the opening 6 by the closing action of the valve members.

The material used to fabricate the iris valve of my invention will be dependent on the ultimate use thereof. Where the fluid under control contains highly corrosive materials, the component parts thereof may be constructed of stainless steel. In addition, suitable noncorrosive metal alloys which are readily known in the art can be employed. It will sometimes be advantageous to coat the moving parts of the valve with various high temperature coatings to aid movement and insure tight fit. For example, polytetrofluoethylene and polyphenylene sulfide resins can be used for this purpose. In some instances it may be advisable to fabricate parts from synthetic materials such as nylon and high density polyethylene plastics.

The valve of my invention has many uses, some of which are unique due to the design thereof. Thus, the valve can be used as an exploration aid when drilling for minerals, oil, gas or water. Thus, the valve is set in place with the initial string of casing, and subsequent drilling is simply accomplished through orifice 6. If the well blows, or when the drill string is removed, the valve will automatically close by interrupting power to the unit. In undersea drilling operations, the valve can be used on the sea floor, and also be used as the inlet means of a column which is evacuated over the drill hole area. These types of columns are well known in the drilling art. Once again, the automatic closure feature of the valve provides greater safety both to operators and to the environment.

The most preferred drive means for activating the valve comprises an electrical motor having a suitable brake device. The electrical power supplied to the motor can be by means of alternate or direct current in a self-contained or conventional delivery type system. When self-contained electrical power units are employed, as for example, batteries, fuel cells or solor cells, the current delivery to the motor can be regulated by remote means such as radio control.

As current is supplied to the motor windings, the drive gear means will cause the valve to open. The diameter of the valve opening can easily be regulated to be directly proportional to the amount and/or rate of current supplied. A switching means is then activated which transfers current to a magentic type brake which holds the valve in an open position. Thus, disruption of the current flow will cause the brake to release, and the valve literally "springs" closed. It is of course obvious that by simply reversing the direction of rotation of the actuating plate and positioning the iris vane members in an open position, the valve can be held in open position by the spring tension means and the gear means utilized to "drive" the valve closed. In this embodiment, closure is still extremely fast compared to conventional valves by adjusting the gear ratios of the drive gear and the actuating plate.

Reasonable variations and modifications of my invention will be readily apparent to those skilled in the art without departing from the spirit and scope of that which has been above described.

I claim:

1. An iris type check valve for regulating the flow of fluids therethrough which comprises a generally circular casing having a fluid inlet and outlet means concentrically disposed along the central axis of the valve, and having disposed into the interior thereof on an axis which is about a ninety degree angle to the central axis at least one pair of pivot pins; a drive means extending into the interior of the casing suitably activated by a power source; a concentric actuator plate means engaged to be rotated in a generally circular path by said drive means and having mounted thereon at least one pair of activator pins; and at least one vane plate comprising a pair of matched vane members each of which are generally trianguar in shape, the apex thereof having means engaging said pivot pins and a cam slot engaging said activator pins, one member of said vane pair having a projecting portion which coincidentally fits into a recessed portion of the other member of said vane pair such that when the vane members engage one another in a closed position the vane plate is of substantially uniform thickness; and each of said vane members having the coincidentally fitting edge thereof defined to form a half-circle, the radius of which is equal to one-half the diameter of the opening formed by the vane members when fully disengaged by the rotation of said actuator plate.

2. The valve of claim 1 wherein the valve contains at least two pairs of pivot pins each located at a ninety degree angle to the central axis and from one another and at least two of said vane plates, one vane plate being mounted immediately adjacent to the other plate so said plates slide over one another when the pairs of matched vane members move laterally to open or close the valve.

3. The valve of claim 1 wherein the matched vane members are retained in an open or closed relation by an adjustable tension means, one of which engages each of said vane members to apply a force against the direction of lateral movement thereof.

4. The valve of claim 1 wherein the casing includes a concentric sealing ring attached to the inlet side of the casing to which is removably attached a bottom plate having mounted thereon said inlet means.

5. The valve of claim 1 wherein the inlet and outlet means are adapted to be attached to fluid transmitting pipe.

6. The valve of claim 1 wherein the actuating plate includes a concentric raised surface on which said vane members slidably contact as said members are moved laterally to open and close the valve.

7. The valve of claim 1 wherein the drive means is a gear which is engaged with gear teeth provided on the outer edge of said activating plate.

8. The valve of claim 1 wherein the power source is an electrical motor.

9. The valve of claim 8 wherein the electrical motor is provided in combination with a current switching means and a magnetic brake, the current being supplied to the motor thus being capable of being transferred from the motor to said brake to hold the valve in a closed or open position.

* * * * *